(12) United States Patent
Tsukimura et al.

(10) Patent No.: US 7,671,915 B2
(45) Date of Patent: *Mar. 2, 2010

(54) SOLID-STATE IMAGING APPARATUS

(75) Inventors: Mitsuhiro Tsukimura, Hachioji (JP);
Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 230 days.

This patent is subject to a terminal disclaimer.

(21) Appl. No.: 11/882,354

(22) Filed: Aug. 1, 2007

(65) Prior Publication Data

US 2008/0030605 A1 Feb. 7, 2008

(30) Foreign Application Priority Data

Aug. 2, 2006 (JP) ............................... 2006-210681

(51) Int. Cl.
*H04N 3/14* (2006.01)
*H04N 5/335* (2006.01)

(52) U.S. Cl. ..................... 348/308; 348/294; 348/302

(58) Field of Classification Search ................ 348/296, 348/297

See application file for complete search history.

(56) References Cited

U.S. PATENT DOCUMENTS

| 6,731,335 | B1* | 5/2004 | Kim et al. .................... 348/308 |
| 6,867,806 | B1* | 3/2005 | Lee et al. ..................... 348/308 |
| 2002/0080263 | A1* | 6/2002 | Krymski ..................... 348/364 |
| 2005/0104983 | A1* | 5/2005 | Raynor ....................... 348/294 |
| 2005/0110885 | A1* | 5/2005 | Altice et al. ................. 348/308 |
| 2006/0208285 | A1* | 9/2006 | Inoue et al. .................. 257/239 |
| 2008/0002043 | A1* | 1/2008 | Inoue et al. .................. 348/296 |
| 2008/0018764 | A1* | 1/2008 | Mizoguchi ................... 348/308 |

FOREIGN PATENT DOCUMENTS

JP 2002-320141 A 10/2002

* cited by examiner

*Primary Examiner*—Sinh Tran
*Assistant Examiner*—Jason Flohre
(74) *Attorney, Agent, or Firm*—Westerman, Hattori, Daniels & Adrian, LLP

(57) ABSTRACT

A solid-state imaging apparatus including: a pixel section having two-dimensionally arrayed unit pixels each having a first pixel and a second pixel respectively containing photoelectric conversion devices that are located at positions regarded as the same position at which image is formed by an imaging optical system; a reset control means for simultaneously resetting respectively independently all first pixels and all second pixels of each unit pixel arrayed in the pixel section; a difference signal output means for obtaining a difference signal between signals of the first pixel and of the second pixel; a control section for rendering control such that a reset is effected of signals of all first pixels of the pixel section and, after a desired exposure time, a reset is effected of signals of all second pixels of the pixel section by the reset control means, and then signals of the first pixel and of the second pixel are read out respectively in a simultaneous or substantially simultaneous manner immediately after the reset of signal of all second pixels by the reset control means so as to output a difference signal between these as imaging signal by the difference signal output means; and a characteristic difference correction means for correcting a characteristic difference between the first pixel and the second pixel.

6 Claims, 13 Drawing Sheets

SOLID-STATE IMAGING APPARATUS

This application claims benefit of Japanese Patent Application No. 2006-210681 filed in Japan Aug. 2, 2006, the contents of which are incorporated by this reference.

BACKGROUND OF THE INVENTION

The present invention relates to solid-state imaging apparatus having a concurrent shutter (hereinafter referred to as global shutter) function, and more particularly relates to a solid-state imaging apparatus having a global shutter function so as to be capable of obtaining imaging data having a high image quality.

Conventionally, XY-addressing read methods are generally used to read pixel signals in MOS solid-state imaging apparatus. The construction of MOS solid-state imaging apparatus and XY-addressing read method thereof will be described below by way of FIGS. 1, 2 and 3. FIG. 1 shows a general pixel construction to be used in a MOS solid-state imaging apparatus. What is denoted by numeral 600 in FIG. 1 is a single pixel. Shown respectively therein are: 606, a photodiode serving as photoelectric conversion device; 602, a transfer transistor for transferring signal charge generated at photodiode 606 to a memory 605; 601, a reset transistor for resetting the memory 605 and photodiode 606; 604, an amplifier (amplification transistor) for amplifying and reading voltage level of the memory 605; and 603, a select transistor for selecting the pixel to transmit an output of the amplifier 604 to a vertical signal line 614. Here, these components but photodiode 606 are shielded from light.

Also referring to FIG. 1, denoted by numeral 610 is a pixel power supply, electrically connected to drain of the amplifier 604 and drain of the reset transistor 601. 611 is a reset line for resetting pixels corresponding to one row, which is electrically connected respectively to the gates of reset transistor 601 of the pixels corresponding to one row. 612 is a transfer line for transferring signal charge of the pixels corresponding to one row to the memory 605 of the respective pixels, which is electrically connected respectively to the gates of transfer transistor 602 corresponding to one row. 613 is a select line for selecting pixels corresponding to one row, which is electrically connected respectively to the gates of select transistor 603 corresponding to one row. Use of the pixel construction having four transistors in this manner (hereinafter referred to as 4-Tr pixel) achieves a photoelectric conversion function, reset function, amplification/read function, temporary memory function, and select function.

FIG. 2 shows a general fundamental construction of the solid-state imaging apparatus using XY-addressing read method. A light receiving section is constituted by a pixel array 700 where pixels 600 having the pixel construction shown in FIG. 1 are arrayed in m-rows by n-columns. A vertical scanning circuit 704 scans the pixel array 700 while outputting to the pixel array 700 a row select signal $\phi$SELi (i=1, 2, 3, . . . m), row reset signal $\phi$RSi, and row transfer signal $\phi$Txi. At this time, the row select signal $\phi$SELi is transmitted to the gate of select transistor 603 of the pixels of i-th row through the select line 613, row reset signal $\phi$RSi is transmitted to the gate of reset transistor 601 of the pixels of i-th row through the reset line 611, and row transfer signal $\phi$TXi is transmitted to the gate of transfer transistor 602 of the pixels of i-th row through the transfer line 612.

When signals of the pixels of i-th row are to be read out, row select signal $\phi$SELi of i-th row is inputted to the pixel array 700 from the vertical scanning circuit 704, and when photodiodes 606 of the pixels of i-th row are to be reset, row reset signal $\phi$RSi and transfer signal $\phi$TXi of i-th row are inputted to the pixel array 700 from the vertical scanning circuit 704. When the memory 605 of the pixels of i-th row are to be reset, row reset signal $\phi$RSi of i-th row is inputted to the pixel array 700 from the vertical scanning circuit 704. When signal charge of the pixels of i-th row is to be transferred to the memory 605, row transfer signal $\phi$TXi of i-th row is inputted to the pixel array 700 from the vertical scanning circuit 704.

Of the signals of the pixels of selected i-th row, after processing such as the canceling of FPN (fixed pattern noise) at a row parallel processing circuit 701, the results of processing are stored to a line memory 702. Subsequently, scan and read are effected while sequentially selecting through a horizontal select switch the pixel signals corresponding to one row stored at the line memory 702 based on the outputting of horizontal scanning signal $\phi$Hj (j=1, 2, 3, . . . n) by a horizontal scanning circuit 703. By sequentially effecting this processing from the first row to m-th row, the signals of all pixels of the pixel array 700 can be scanned and read out.

FIG. 3 is a timing chart showing drive timing of the solid-state imaging apparatus of such XY-addressing read method. The drive operation will be described with noticing the period of T1. As row select signal $\phi$SEL1 is outputted and the reset signal $\phi$RS1 is then outputted from the vertical scanning circuit 704, pixels of the first row are selected and reset level of the pixels is read out. Further, as row transfer signal $\phi$TX1 is outputted from the vertical scanning circuit 704, signal charge generated at the photodiodes 606 of the first row is transferred to the memory 605 so that signal level of the pixels is read out. Subsequently, row reset signal $\phi$RS1 and row transfer signal $\phi$TX1 are outputted to reset the photodiode 606 and memory 605. The accumulation period of the signal to be read out here is the period indicated by Ta in the figure from immediately after the resetting of photodiode 606 in the previous frame to its transferring. Further, a differential processing between the signal level and the reset level is effected during the period of T1, and signal thereof is stored to the line memory 702. After that, signals of the first row are outputted by causing an operation of the horizontal scanning circuit 703 to output the horizontal scanning signal $\phi$Hj (j=1, 2, 3, . . . n). Thereafter similar operation is effected of each row.

In such an ordinary XY-addressing read method (rolling shutter read method), since the point in time for accumulating signal is different from one row to another of the pixel array, or more specifically since a difference in the point in time corresponding to one frame at maximum exists between the first row to be read out first and the m-th row to be read out at the end, a problem of distorted image occurs when a rapidly moving object is photographed.

The global shutter read method is provided as a method for solving the above problem in the ordinary XY-addressing read method. Such read method will now be briefly described. FIG. 4 shows drive timing when global shutter operation is effected in a solid-state imaging apparatus having the same fundamental construction as the one shown in FIGS. 1 and 2.

First, as the row reset signals $\phi$RS1 to $\phi$RSm and row transfer signals $\phi$TX1 to $\phi$TXm of all the rows are simultaneously outputted from the vertical scanning circuit 704, photodiodes 606 of the pixels corresponding to all rows are reset. Subsequently, after a certain signal accumulation period, row transfer signals $\phi$TX1 to $\phi$TXm of all rows are simultaneously outputted from the vertical scanning circuit 704. The signal charges accumulated within the certain period at photodiodes 606 of the pixels corresponding to all rows are thereby transferred simultaneously for all rows to the memory 605. By such operation, the global shutter operation is effected.

A row-by-row read of the signals stored at memory 605 is then started. First, as row select signal φSEL1 is outputted from the vertical scanning circuit 704, the pixels of the first row are selected and the signal level of the pixels are read out. Further, as row reset signal φRS1 is outputted from the vertical scanning circuit 704, the memory 605 of the first row is reset so that the reset level of the pixels is read out. When read of the signal level and reset level of the pixels of the first row is complete, the pixels of the second row are selected and the signal level and reset level thereof are read out. By effecting this signal read scanning to m-th row, signals corresponding to one frame are read out. Although a horizontal scanning signal φHj of the horizontal scanning circuit 703 has not been shown for ease of explanation, the horizontal scanning signal φHj (j=1, 2, 3, . . . n) is outputted in an interval from the reading of the signals of i-th row to the reading of the signals of i+1-th row.

Japanese Patent Application Laid-Open 2002-320141 for example discloses a solid-state imaging apparatus using 4-Tr pixels, in which global shutter operation is effected.

SUMMARY OF THE INVENTION

In a first aspect of the present invention, there is provided a solid-state imaging apparatus including: a pixel section having two-dimensionally arrayed unit pixels each having a first pixel and a second pixel respectively containing photoelectric conversion devices that are located at positions regarded as the same position at which image is formed by an imaging optical system; a reset control means for simultaneously resetting respectively independently all first pixels and all second pixels of each unit pixel arrayed in the pixel section; a difference signal output means for obtaining a difference signals between signal of the first pixel and of the second pixel; a control section for rendering control such that a reset is effected of signals of all first pixels of the pixel section and, after a desired exposure time, a reset is effected of signals of all second pixels of the pixel section by the reset control means, and then signals of the first pixel and of the second pixel are read out respectively in a simultaneous or substantially simultaneous manner immediately after the reset of signal of all second pixels by the reset control means so as to output a difference signal between these as imaging signal by the difference signal output means; and a characteristic difference correction means for correcting a characteristic difference between the first pixel and the second pixel.

In a second aspect of the invention, the characteristic difference correction means in the solid-state imaging apparatus according to the first aspect has a sensitivity difference correcting section where a ratio of sensitivity characteristic between the first pixel and the second pixel is used as sensitivity difference correction data.

In a third aspect of the invention, the sensitivity difference correcting section in the solid-state imaging apparatus according to the second aspect effects correction of pixel signal of at least one of the first pixel and the second pixel based on the sensitivity difference correction data.

In a fourth aspect of the invention, the sensitivity difference correcting section in the solid-state imaging apparatus according to the second or third aspect uses the sensitivity difference correction data which is acquired with setting the condition of accumulation and the condition of the imaging optical system to be the same for the first pixel and the second pixel.

In a fifth aspect of the invention, the sensitivity difference correcting section in the solid-state imaging apparatus according to any one of the second to fourth aspects changes the sensitivity difference correction data in accordance with image taking conditions.

In a sixth aspect of the invention, the solid-state imaging apparatus according to any one of the first to fifth aspects further includes a shading correction means.

DESCRIPTION OF THE PREFERRED EMBODIMENTS

Some embodiments of the solid-state imaging apparatus according to the invention will be described below with reference to the drawings.

Figure 1:
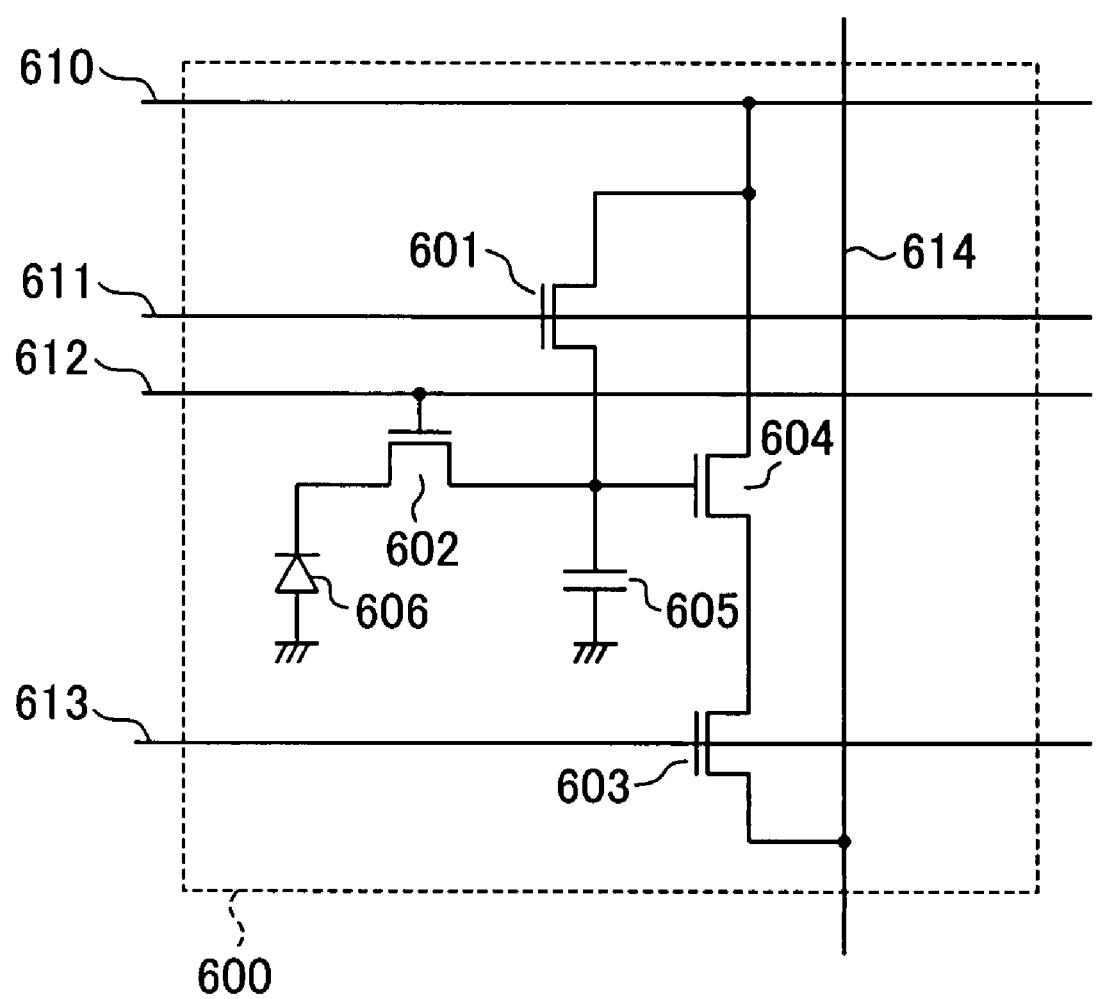
FIG. 1 is a circuit diagram showing pixel construction of a prior-art MOS solid-state imaging apparatus.
Figure 2:
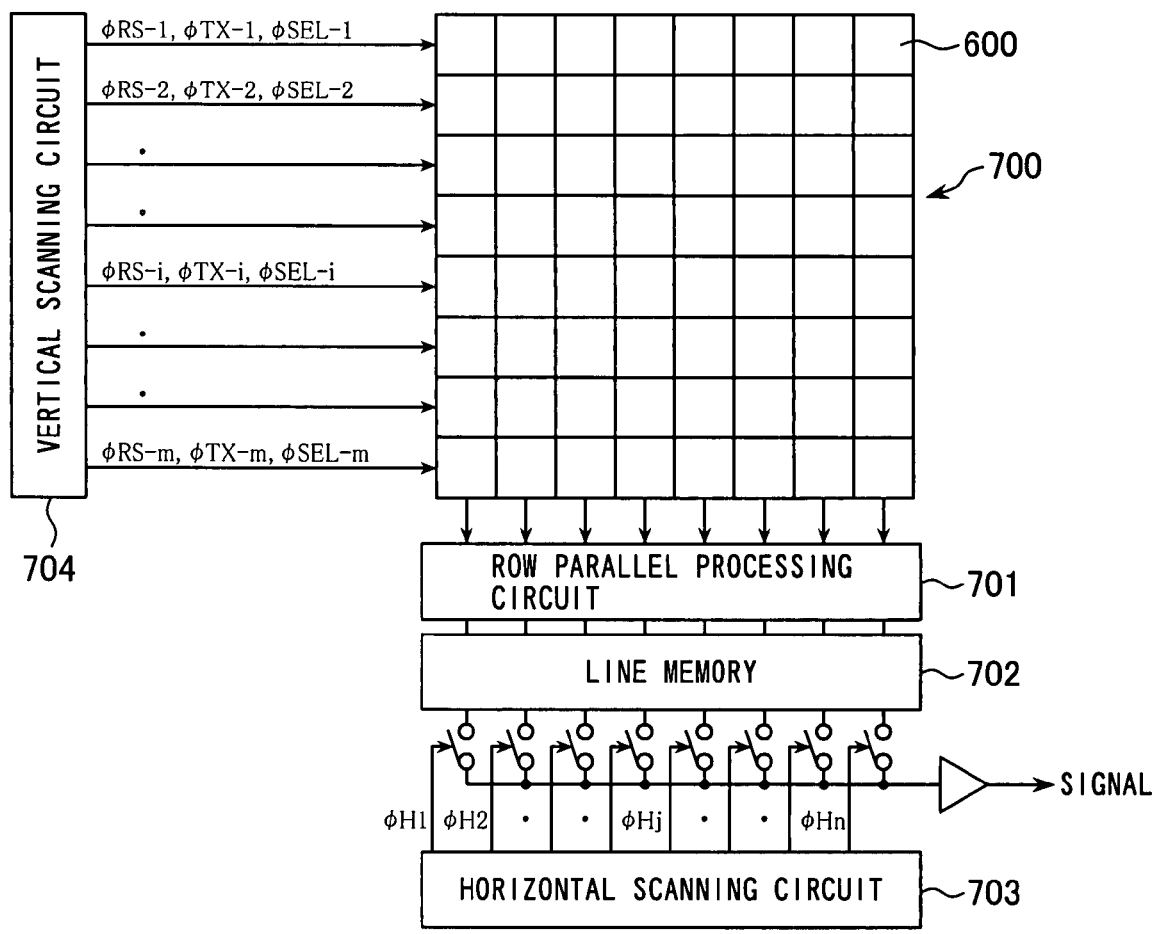
FIG. 2 is a block diagram showing an overall construction of MOS solid-state imaging apparatus using the conventional XY-addressing read method.
Figure 3:
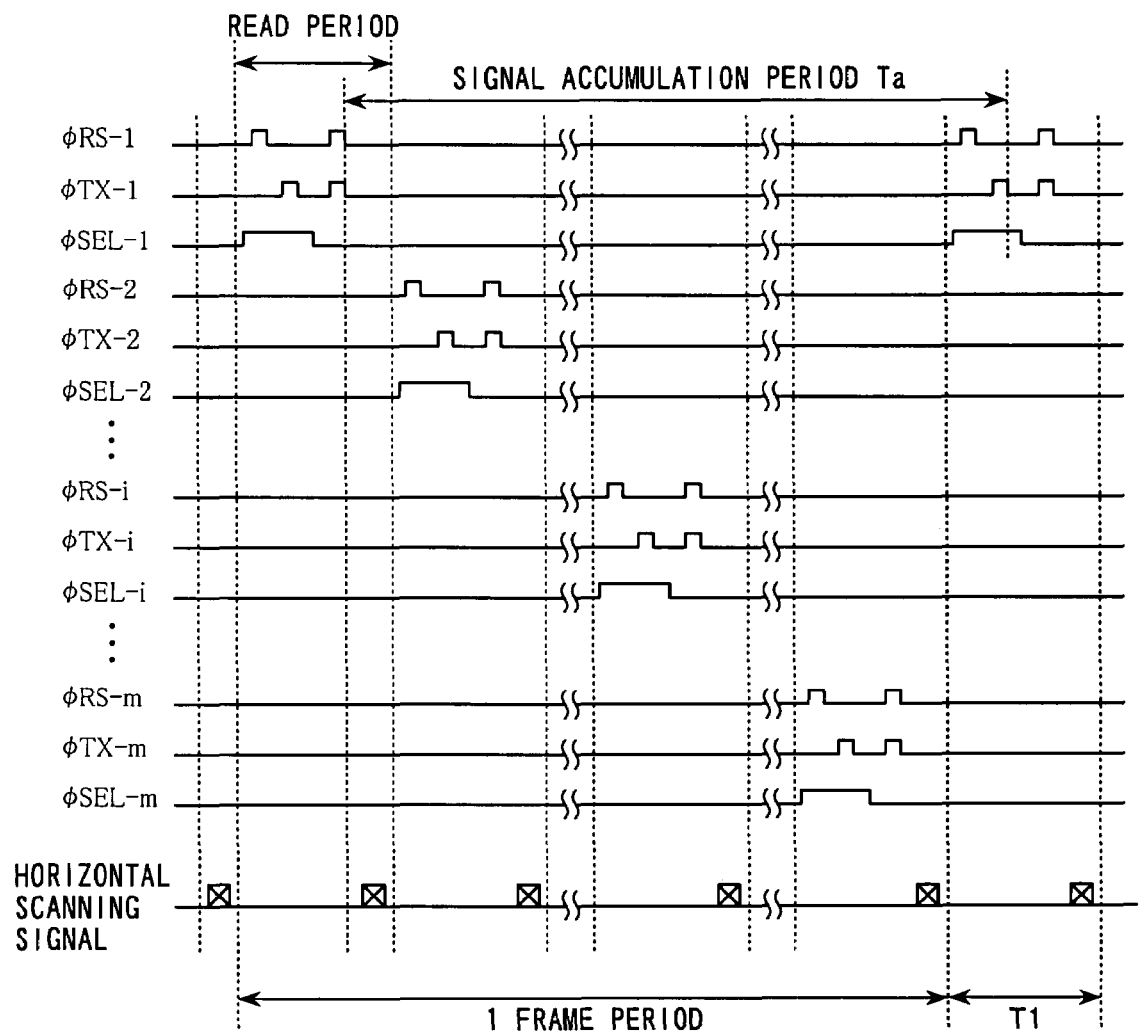
FIG. 3 is a timing chart for explaining operation of XY-addressing read method of the MOS solid-state imaging apparatus shown in FIG. 2.
Figure 4:
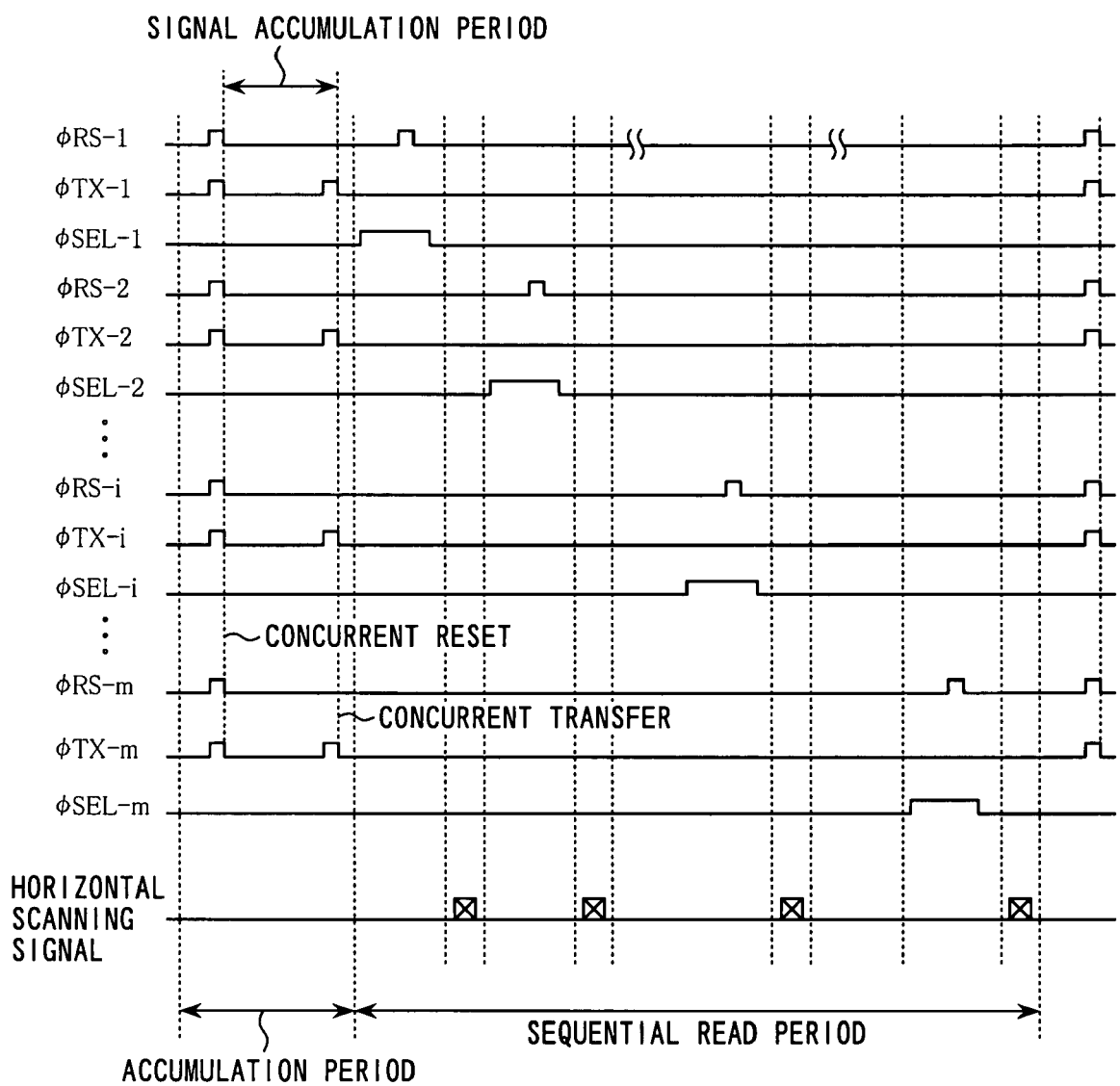
FIG. 4 is a timing chart in the case where the MOS solid-state imaging apparatus shown in FIG. 2 is operated in a global shutter read method.
Figure 5:
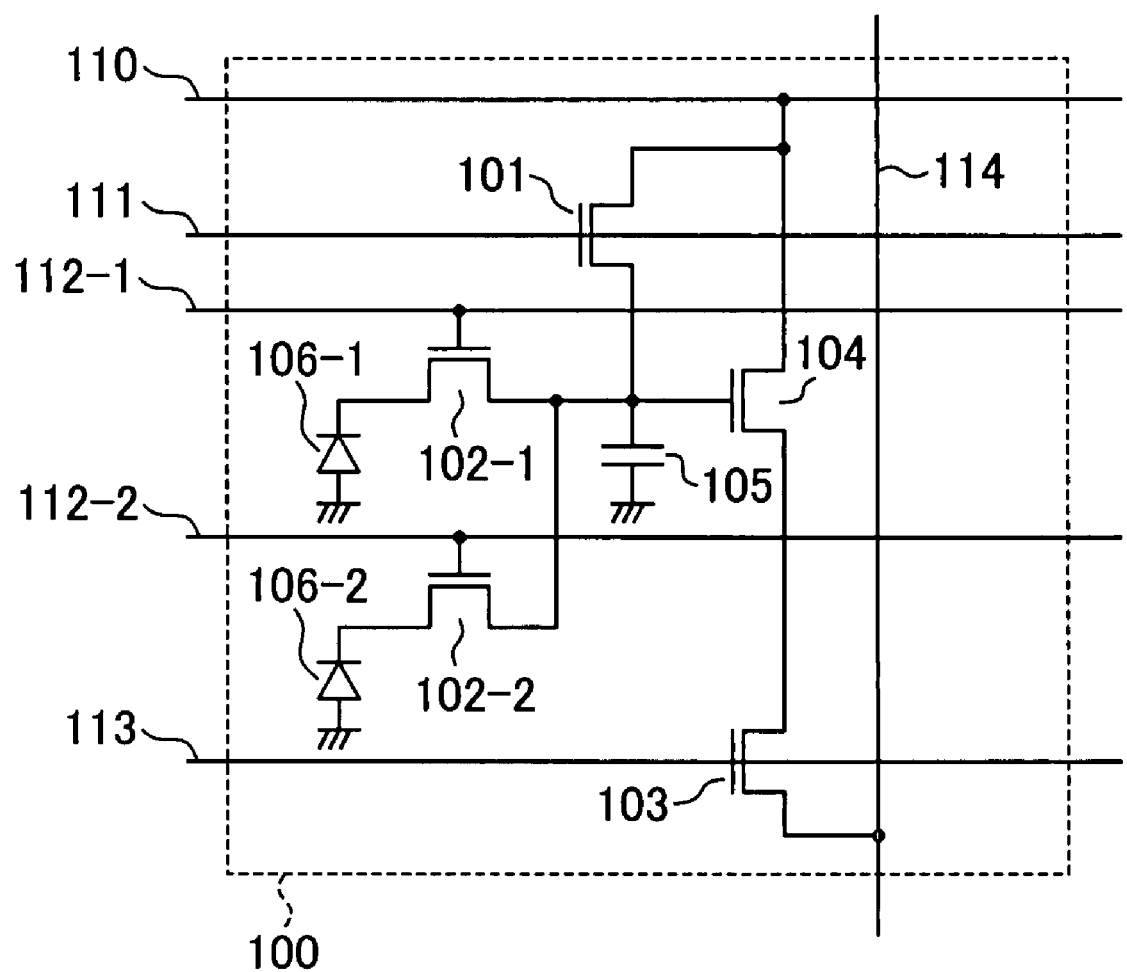
FIG. 5 is a circuit diagram showing pixel construction in a fundamental construction of the solid-state imaging apparatus according to the invention.

Before describing an embodiment of the solid-state imaging apparatus according to the invention, a fundamental construction of the solid-state imaging apparatus according to the invention will now be described. FIG. 5 is a circuit diagram showing a pixel construction of the solid-state imaging apparatus according to the fundamental construction. In FIG. 5, denoted by numeral 100 is a unit pixel. The unit pixel 100 has construction where two photodiodes are provided in the conventional 4-Tr construction unit pixel and corresponding two transfer transistors are provided. In particular, it includes: a first photodiode 106-1 and a second photodiode 106-2; a first and a second transfer transistors 102-1, 102-2 for transferring signal charges generated at the first and the second photodiodes 106-1, 106-2 respectively to a memory 105; a reset transistor 101 for resetting the memory 105, and first and second photodiodes 106-1, 106-2; an amplification transistor 104 for amplifying and reading voltage level of the memory 105; and a select transistor 103 for selecting the pixel to transmit an output of the amplification transistor 104 to a vertical signal line 114. Here in this case, the first and second photodiodes 106-1, 106-2 are provided as having the same size on the same one semiconductor substrate, at locations that are optically regarded as the same image forming position, and the other components but the first and second photodiodes 106-1, 106-2 are shielded from light.

It should be noted that, in FIG. 5, a pixel power supply 110 is electrically connected respectively to drain of the amplification transistor 104 and to drain of the reset transistor 101. Denoted by 111 is a reset line for resetting pixels corresponding to one row, which is electrically connected to gate of the reset transistor 101 of the pixels corresponding to one row. Denoted by 112-1 and 112-2 are a first and second transfer lines for transferring signal charges of the first photodiode 106-1 and the second photodiode 106-2 of the pixels corresponding to one row to memory 105 of each pixel, which are electrically connected respectively to the gates of the first and the second transfer transistors 102-1, 102-2 of the pixels corresponding to one row. Denoted by 113 is a select line for selecting the pixels corresponding to one row, which is electrically connected to the gate of select transistors 103 corresponding to one row.

Figure 6:
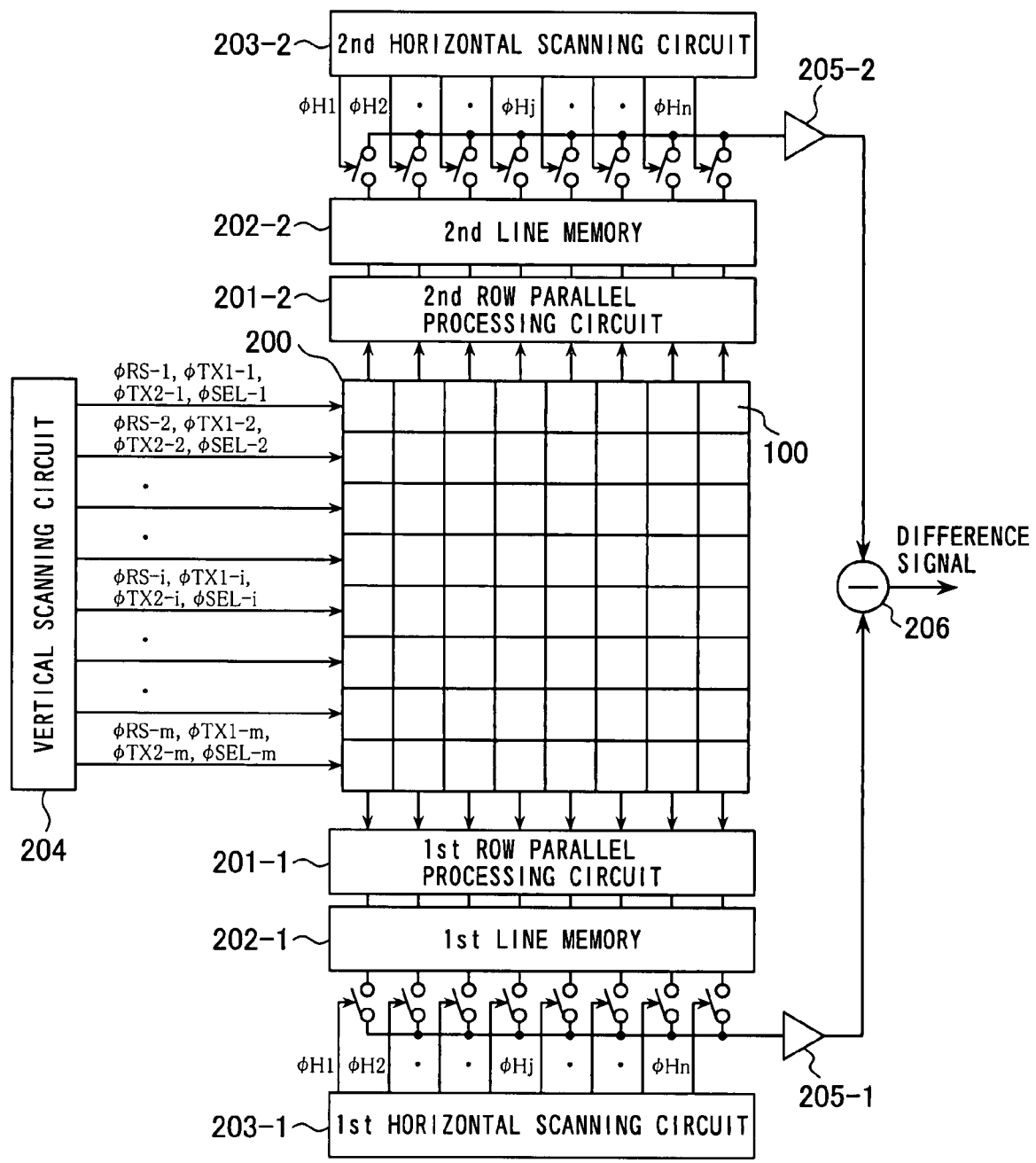
FIG. 6 is a block diagram showing an overall construction of the fundamental construction of the above solid-state imaging apparatus.

FIG. 6 is a block diagram showing an overall construction of the solid-state imaging apparatus according to the fundamental construction having a pixel array 200 where unit pixels 100 constructed as shown in FIG. 5 are arrayed in m-rows by n-columns. Referring to FIG. 6, denoted by 204 is a vertical scanning circuit for scanning the pixel array 200 while outputting row reset signal φ RS-i, first and second transfer signals φTX1-i, φTX2-i, and row select signal φSEL-i respectively to the reset line 111, first and second transfer lines 112-1, 112-2, and select line 113. Denoted by 201-1 is a first row parallel processing circuit for effecting such processing as FPN (fixed pattern noise) cancel of the pixel signals from the first photodiode 106-1 of the pixels corresponding to one row; 202-1 is a first line memory for storing result of the processing at the first row parallel processing circuit 201-1; and 203-1 is a first horizontal scanning circuit for scanning while sequentially selecting through a select switch the pixel signals of first photodiodes 106-1 corresponding to one row stored at the first line memory 202-1 so as to output them through a first amplifier 205-1.

Further denoted by 201-2 is a second row parallel processing circuit for effecting such processing as FPN cancel of the pixel signals from the second photodiode 106-2 of the pixels corresponding to one row; 202-2 is a second line memory for storing result of the processing at the second row parallel processing circuit 201-2; and 203-2 is a second horizontal scanning circuit for scanning while sequentially selecting through a select switch the pixel signals of second photodiodes 106-2 corresponding to one row stored at the second line memory 202-2 so as to output them through a second amplifier 205-2. Denoted by 206 is a difference signal output means for outputting a difference signal between the pixel signal from the first photodiode 106-1 outputted from the first amplifier 205-1 and the pixel signal from the second photodiode 106-2 outputted from the second amplifier 205-2. It should be noted that the first and second horizontal scanning circuits may be combined.

Figure 7:
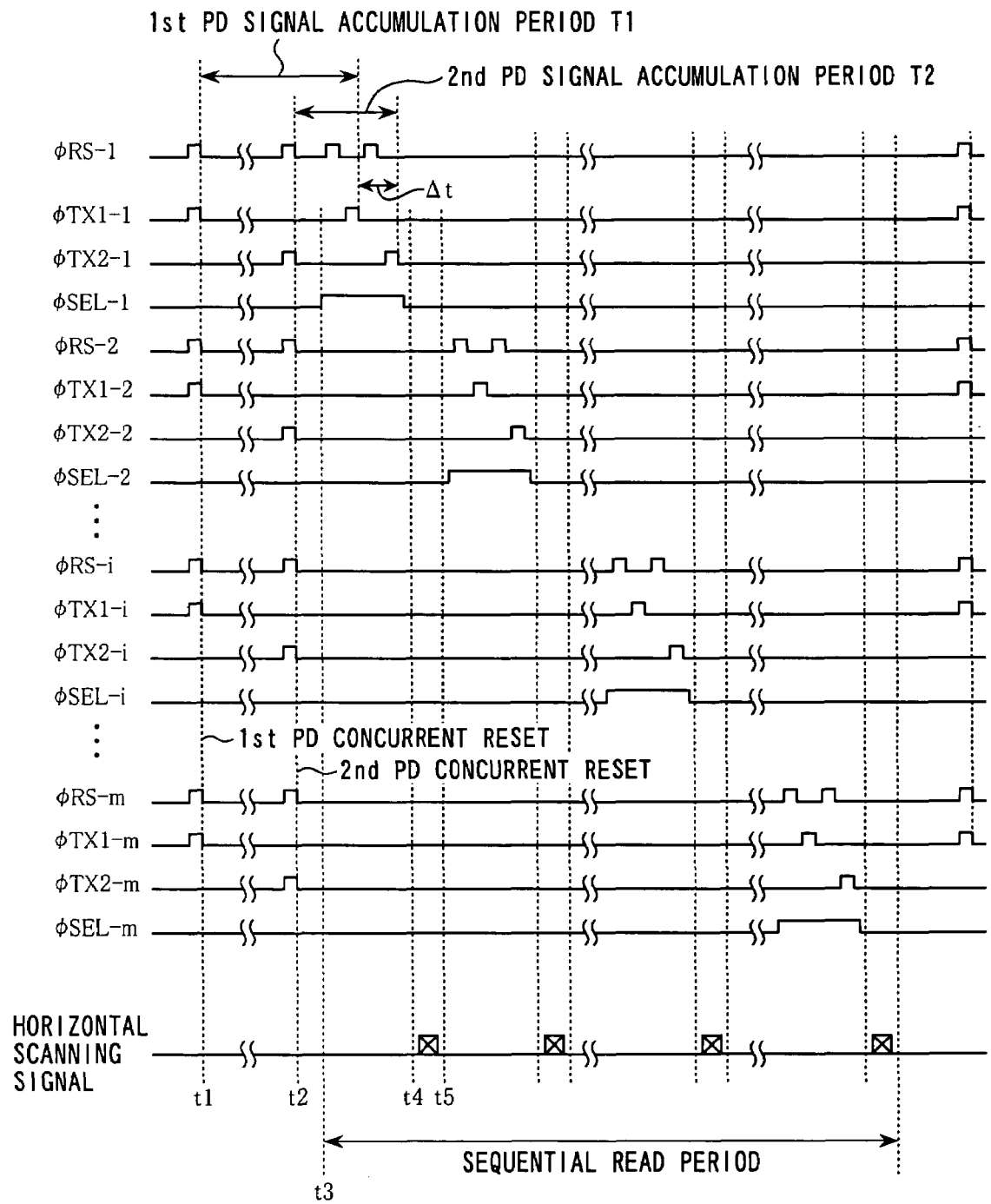
FIG. 7 is a timing chart for explaining operation of the solid-state imaging apparatus according to the fundamental construction shown in FIG. 6.

An operation of the solid-state imaging apparatus according to such fundamental construction will now be described with reference to the timing chart of FIG. 7. First at time t1, reset signal φRS-i and first transfer signal φTX1-i are inputted for all rows of the pixel array 200 to concurrently reset the first photodiode 106-1 and memory 105 of all pixels. Next at time t2 after passage of a predetermined time (exposure time), reset signal φRS-i and second transfer signal φTX2-i are inputted for all rows to concurrently reset the second photodiode 106-2 and memory 105 of all pixels.

Next at time t3, select signal of the first row φ SEL-1 is inputted and then the first and the second transfer signals φTX1-1, φTX2-1 of the first row are respectively inputted to select and read the pixel signals of the first and the second photodiodes 106-1, 106-2 of the pixels of the first row. Then respective processing is effected at the first and the second row parallel processing circuit 201-1, 201-2, and result of the processing thereat is stored to the first and the second line memories 202-1, 202-2. Next in a period from time t4 to t5, the pixel signals of the first row stored at the first and the second line memories 202-1, 202-2 are simultaneously read out by the first and the second horizontal scanning circuits 203-1, 203-2 and are inputted to the difference signal output means 206. A difference signal between the first and the second photodiodes 106-1, 106-2 is then outputted as pixel signal of the first row by a differential processing at the difference signal output means 206. After that, the pixel signals of the second row and after are sequentially outputted in a similar manner.

At this time, the period from point in time t1 at which the first photodiodes 106-1 are concurrently reset to the inputting of the next first transfer signal φTX1-1 of the first row is a signal accumulation period T1 of the first photodiode 106-1. On the other hand, the period from point in time t2 at which the second photodiodes 106-2 are concurrently reset to the inputting of the next second transfer signal φTX2-1 of the first row is a signal accumulation period T2 of the second photodiode 106-2. A time difference Δt between the respective inputting of the first and the second transfer signals φTX1-1, φTX2-1 of the second time is then very short as compared to the period of (T1-T2). Accordingly, the difference signal between the first and the second photodiodes 106-1, 106-2 outputted from the difference signal output means 206 becomes of the difference between the signal accumulation period T1 of the first photodiode 106-1 and the signal accumulation period T2 of the second photodiode 106-2, or in other words consists only of the signal by accumulation charge in a predetermined period (exposure period) between the concurrent reset time (t1) of the first photodiode 106-1 and the concurrent reset time (t2) of the second photodiode 106-2.

It is thereby possible to make uniform the exposure time of all pixels so that concurrent exposure signals are obtained. Since the signal read method itself in this embodiment is identical to the conventional rolling shutter method, the problem of dark current is eliminated, and KTC noise (noise occurring at the time of resetting photodiode) is also eliminated. Accordingly, a solid-state imaging apparatus capable of achieving global shutter function is obtained without S/N deterioration of the imaging signal output caused by the effect of dark current or KTC noise.

In the above described fundamental construction, the unit pixel has been shown as one where two photodiodes are provided and corresponding two transfer transistors are provided in a pixel having conventional 4-Tr construction, and the memory, reset transistor, amplification transistor, and select transistor are used in common for the two photodiodes and two transfer transistors. However, one having construction where two pixels of conventional 4-Tr construction are simply combined, i.e., constructed by a first pixel and a second pixel each having 4-Tr construction may be used as the unit pixel.

Also in the above fundamental construction, the first and the second photodiodes in unit pixel have been described as having the same size and the same electrical characteristics, etc. To improve sensitivity of pixel and increase saturation charge amount, however, one serving as a main photodiode may be formed as having a greater size. Even if the first photodiode and the second photodiode are of the same size, their characteristics vary so that a characteristic difference might be caused between the two.

If a characteristic difference occurs between the two photodiodes as described, in subtraction of the signal of the second photodiode from the signal of the first photodiode at the difference signal output means, it is necessary to provide a characteristic difference correction means for correcting characteristic difference between the first and the second photodiodes so as to perform subtraction with correcting the signal of one or the other of the photodiodes.

Figure 8:
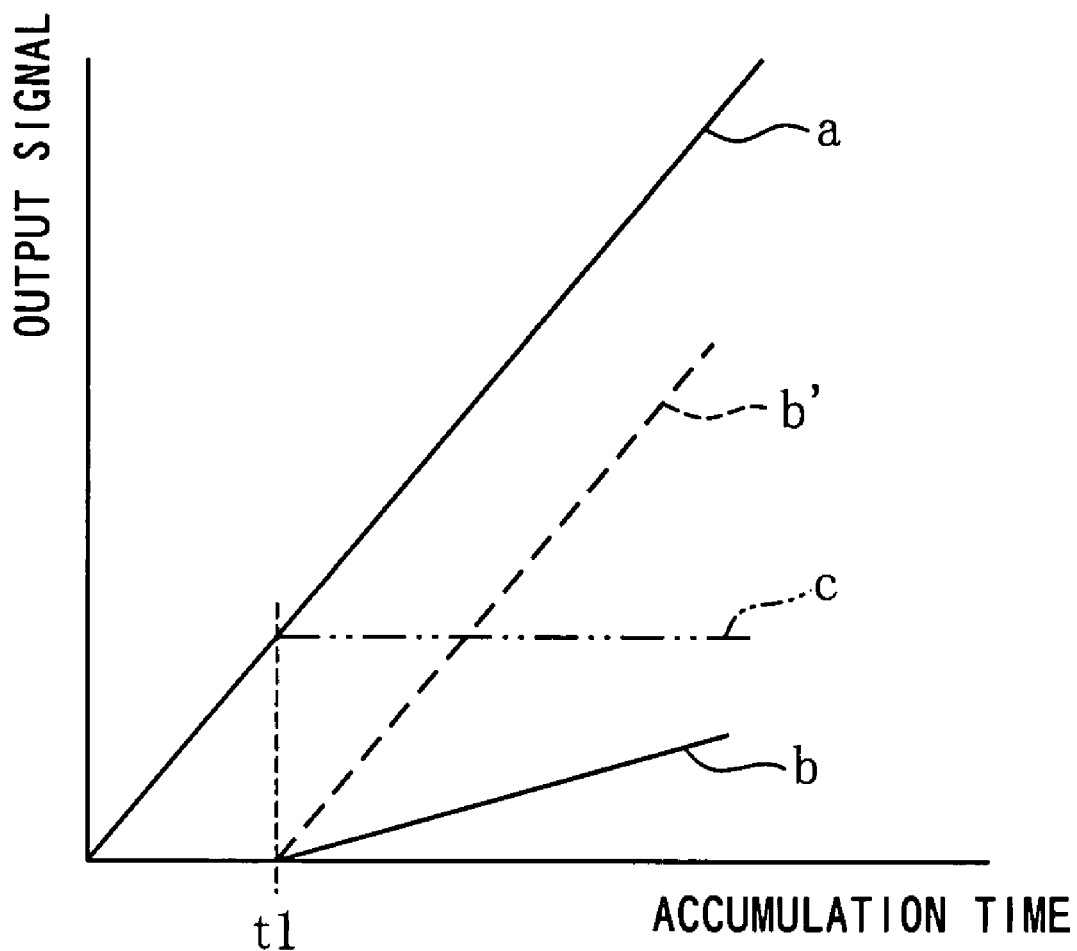
FIG. 8 shows an output characteristic in relation to electric charge accumulation time in the case where a characteristic difference occurs between the two photodiodes.

A description will now be given below in further detail by way of FIG. 8 with respect to the fact that, in the case where a characteristic difference occurs between the two photodiodes for example when the size of the first photodiode is made larger and the size of the second photodiode is made smaller to improve pixel sensitivity and increase saturation charge amount, it is necessary to correct the signals of the two before inputting them to the difference signal output means to allow a differential output. FIG. 8 shows an output characteristic in relation to charge accumulation time of photodiode. In particular in FIG. 8, straight line "a" indicates an output characteristic of the first photodiode of which size is made larger to improve sensitivity, and straight line "b" indicates an output characteristic having a smaller inclination of the smaller-size second photodiode. It should be noted that t1 indicates accumulation start time of the second photodiode.

Since there is a difference in output characteristic as described above between the first photodiode and the second photodiode, their accumulation charge amounts are different from each other even for the same charge accumulation time. Accordingly, if attempts are made to directly obtain a difference signal from the output signals of the two photodiodes with the condition intact and without correcting the output signals, a fluctuation in the differential output occurs depending on the accumulation time. Therefore, the signal output characteristic "b" of the second photodiode having smaller size is corrected as indicated by dotted line "b'" for example by means of gain adjustment using the characteristic difference correction means. By then obtaining differential between signal of the first photodiode as indicated by characteristic "a" and the correction signal of the second photodiode as indicated by characteristic "b'", it is possible to obtain a constant difference signal as indicated by straight line "c". It thereby becomes possible to obtain an image signal for example with higher sensitivity and an increased saturation charge amount.

A specific embodiment of the solid-state imaging apparatus according to the invention will now be described.

Figure 9:
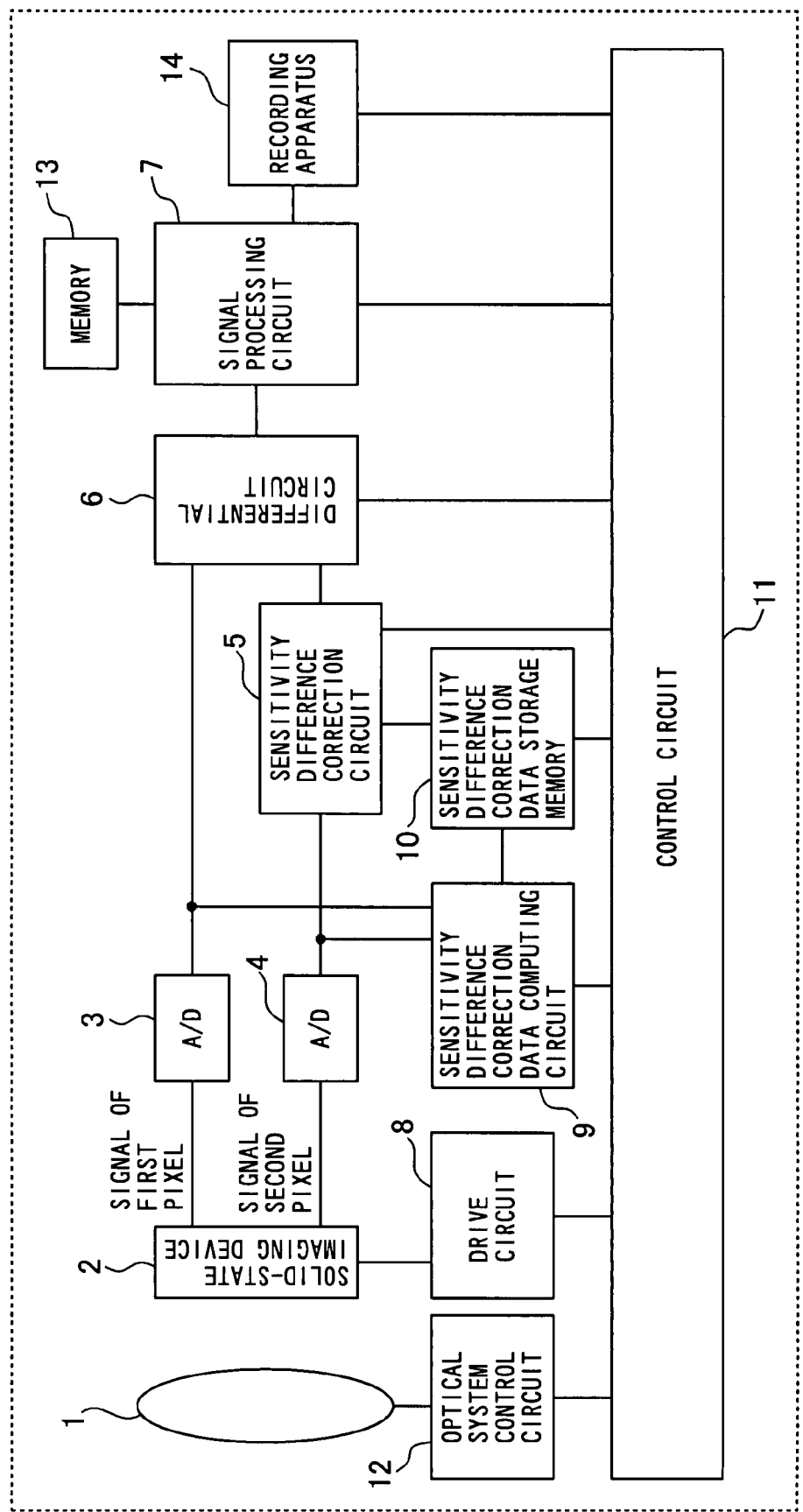
FIG. 9 is a block diagram showing construction of a first embodiment of the solid-state imaging apparatus according to the invention.

FIG. 9 is a block diagram showing construction of the solid-state imaging apparatus according to a first embodiment of the invention. In FIG. 9, what is denoted by 1 is an imaging optical system for image taking of which focal distance and stop are controlled by an optical system control circuit 12. Denoted by 2 is a solid-state imaging device having an equivalent construction as that of the above described fundamental construction where each signal can be independently outputted of the first pixel and the second pixel constituting a unit pixel, disposed at locations that are regarded as substantially the same location at which image is formed by the imaging optical system 1. Drive of the solid-state imaging device is controlled by a drive circuit 8 so that similar operation as that shown in the above fundamental construction can also be effected. Denoted by 3, 4 each are an A/D conversion apparatus for converting output signal of the solid-state imaging device 2 into digital signal, which are connected to the first pixels and to the second pixels for conversion of the respective signals. Denoted by 5 is a sensitivity difference correction circuit for correcting difference in sensitivity characteristic between the first pixel and the second pixel. The sensitivity difference correction circuit 5 is to correct A/D-converted signal of the second pixel with using sensitivity difference correction data stored at a sensitivity difference correction data storing memory 10 in the case of acquiring imaging data.

Further, denoted by 6 is a differential circuit which obtains the differential between A/D converted signal of the first pixel and the signal of the second pixel after correction by the sensitivity difference correction circuit 5. Denoted by 7 is a signal processing circuit for processing the signal differentiated at the differential circuit 6; 13 is a memory apparatus for temporarily storing signal processed at the signal processing circuit 7; and 14 is a recording apparatus for recording images obtained at the end. Furthermore, 9 is a sensitivity difference correction data computing circuit to which A/D-converted signal of the first pixel and signal of the second pixel are inputted when acquiring sensitivity difference correction data so that sensitivity difference correction data is computed from these signals. Denoted by 11 is a control apparatus for controlling the solid-state imaging apparatus as a whole, which administers all of the control of the imaging optical system 1, drive control of the solid-state imaging device 2, control of correcting operation from computation to correction of the correction data, imaging operation control from imaging, signal processing to recording, etc.

An operation of the solid-state imaging apparatus according to the first embodiment constructed as the above will now be described. In a general classification, a sensitivity difference correction data acquiring operation for correcting sensitivity characteristic difference and image taking operation are contained in this solid-state imaging apparatus. The sensitivity difference correction data acquiring operation is effected in accordance with the following procedure.

(1) At first, the drive circuit 8 under instruction from the control apparatus 11 controls drive of the solid-state imaging device 2 so that the same exposure time is set for the first pixel and the second pixel.

(2) The image signals of the first pixel and the second pixel of the solid-state imaging device 2 acquired at that time are converted into digital signals respectively at A/D conversion apparatus 3, 4.

(3) The digitized signals of the first pixel and second pixel are inputted to the sensitivity difference correction data computing circuit 9.

(4) At the sensitivity difference correction data computing circuit 9, supposing signal of a certain first pixel (i) as S1(i) and signal of a certain second pixel (i) as S2(i), an output ratio (sensitivity ratio) S1(i)/S2(i) (i=1 to n) of the first pixel and the second pixel is computed correspondingly to the number of pixels (n). The output ratio obtained here is an output ratio between the first pixel and the second pixel disposed at locations that are regarded as substantially the same location at which image is formed by the imaging optical system 1.

(5) The output ratios between the first pixel and the second pixel computed at the step of (4) are stored to the sensitivity difference correction data storing memory 10 as sensitivity difference correction data corresponding to one frame of image.

Figure 10:
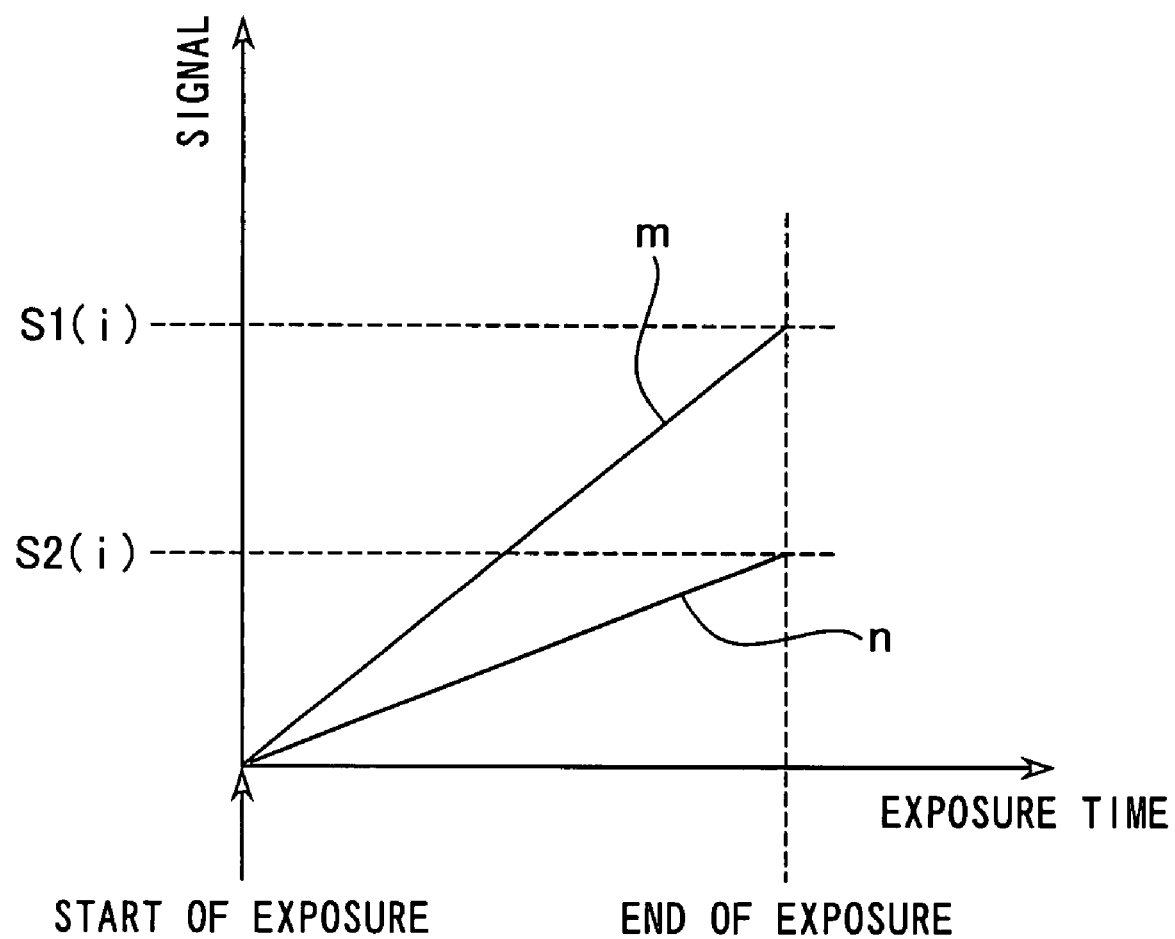
FIG. 10 explains operation at the time of acquiring sensitivity difference correction data in the first embodiment shown in FIG. 9.

FIG. 10 shows the manner of change in signals of a certain first pixel (i) and second pixel (i) in relation to exposure time at the time of the sensitivity difference correction data acquiring operation. Shown here is the case where sensitivity is different between the first pixel (i) and the second pixel (i) and the first pixel (i) has a higher sensitivity, "m" representing change in signal of the first pixel and "n" representing change in signal of the second pixel. At the time of the sensitivity difference correction data acquiring operation, the exposure time and image taking optical conditions are the same for the first pixel (i) and the second pixel (i). Accordingly, difference between each signal level at the end of the exposure time corresponds to sensitivity difference, and ratio thereof can used as sensitivity difference correction data.

The procedure of image taking operation will now be described.

(1) At first, the drive circuit 8 under instruction from the control apparatus 11 controls drive of the solid-state imaging device 2 so that exposure time is different between the first pixel and the second pixel as shown in the above reference example. Here, the only difference in exposure conditions between the first pixel and the second pixel is the exposure time, and the conditions of the imaging optical system such as focal length and stop are the same for both.

(2) The image signals of the first pixel and the second pixel of the solid-state imaging device 2 acquired at that time are converted into digital signals respectively at A/D conversion apparatus 3 and 4.

(3) The digitized signal of the second pixel is inputted to the sensitivity difference correction circuit 5, and is corrected as multiplied by a most suitable data among the sensitivity difference correction data stored at the sensitivity difference correction data storing memory 10. Supposing signal of a certain second pixel (i) at this time as $S22(i)$, the signal after correction is $S22(i) \times S1(i)/S2(i)$ (i=1 to n). Here, the most suitable data refers to data that is obtained when the conditions of the imaging optical system at the time of acquiring the sensitivity difference correction data are substantially equivalent to those at the time of the image taking operation.

(4) Next, the digitized signal of the first pixel and the signal of the second pixel after correction are inputted to the differential circuit 5 to obtain the differential. Supposing the signal of a certain first pixel (i) at this time as $S11(i)$, signal after the differential is $S11(i)-S22(i) \times S1(i)/S2(i)$ (i=1 to n). Such difference signal is a signal that depends on difference in exposure time between the first pixel and the second pixel.

(5) The difference signal is inputted to the signal processing circuit 7 so as to be subjected for example to color processing, interpolation, and gamma processing, and the image taking data at the end is stored at the recording apparatus 14.

In this manner, the sensitivity characteristic difference between the first pixel and the second pixel can be corrected in the solid-state imaging apparatus according to the first embodiment so that, even when variance or difference in sensitivity characteristic occurs between the first pixel and the second pixel, high-quality imaging data can be acquired with correcting such. Further, since a most suitable correction data can be used in correcting the sensitivity characteristic difference between the first pixel and the second pixel, high-quality imaging data can be always acquired even when such conditions as focal length or stop of the imaging optical system are changed.

Figure 11:
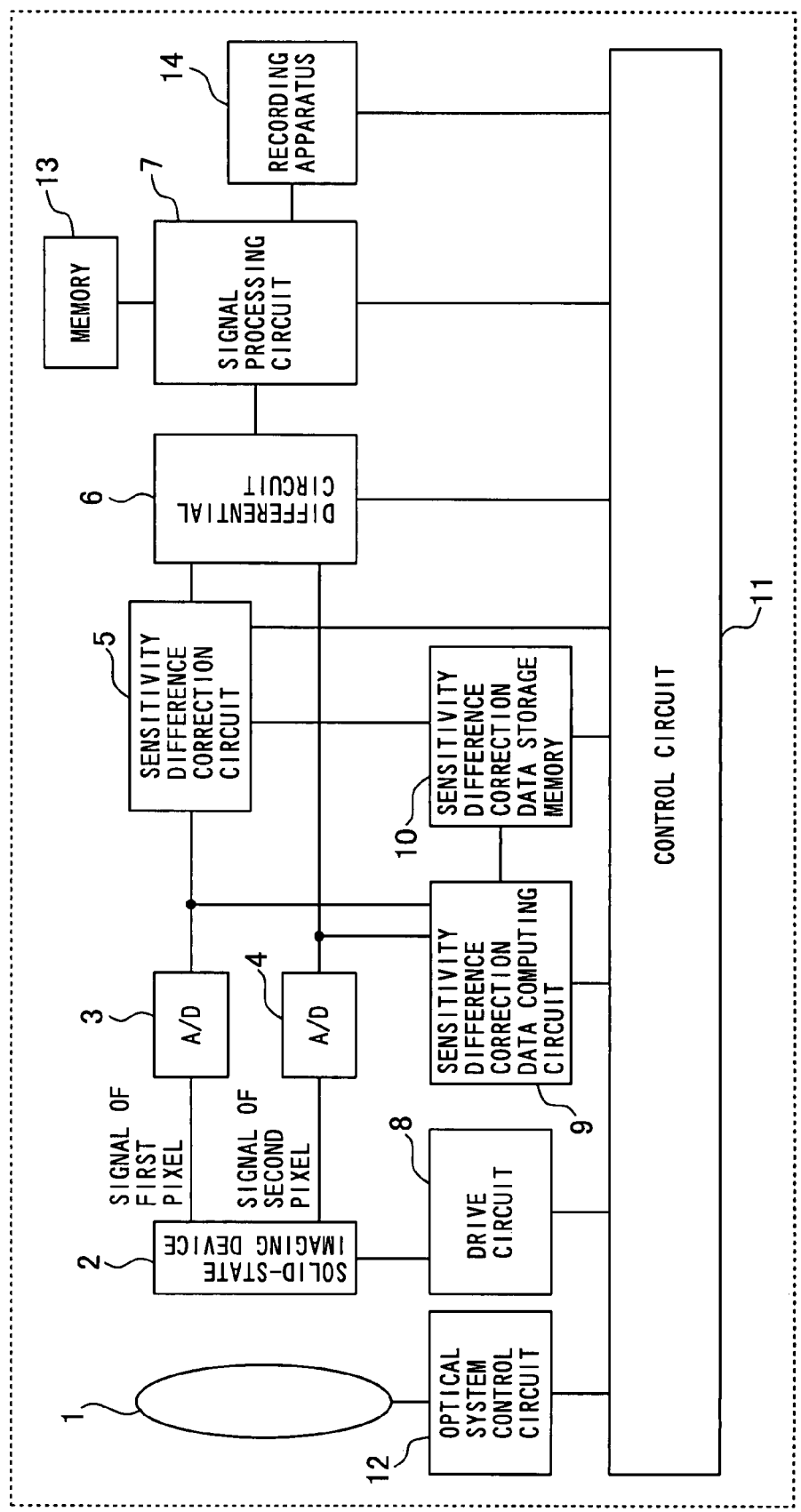
FIG. 11 is a block diagram showing construction of the solid-state imaging apparatus according to a second embodiment.

A second embodiment of the invention will now be described. FIG. 11 is a block diagram showing construction of the solid-state imaging apparatus according to the second embodiment. In this embodiment, the sensitivity difference correction is effected of digitized signal of the first pixel. Accordingly, it is different from the first embodiment shown in FIG. 9 only in that the sensitivity difference correction circuit 5 is disposed on the output signal side of the first pixel, and the rest is the same as the first embodiment.

In the sensitivity difference correction data acquiring operation with such construction, an output ratio (sensitivity ratio) $S2(i)/S1(i)$ (i=1 to n) between the first pixel and the second pixel is computed correspondingly to the number of pixels (n), and such is set as sensitivity difference correction data corresponding to one frame of image. Further at the time of image taking operation, digitized signal of the first pixel is inputted to the sensitivity difference correction circuit 5, and is multiplied by the above sensitivity difference correction data so as to make signal after correction as $S11(i) \times S2(i)/S1(i)$ (i=1 to n). Further, signal after the differential becomes $\{S11(i) \times S2(i)/S1(i) - S22(i)\} \times S1(i)/S2(i)$ (i=1 to n). The above is the only difference from the operation of the first embodiment, and operation of the rest is similar to the first embodiment. Accordingly, similar effects and advantages as in the first embodiment are obtained also in thus constructed second embodiment.

In the above first and second embodiments, the first pixel and the second pixel are shown as provided on the same one semiconductor substrate (single-sensor construction). The first pixel and the second pixel, however, are not necessarily formed on the same one semiconductor substrate and may be formed on separate semiconductor substrates, as far as they are positioned at locations that are regarded as substantially the same location at which image is formed by the imaging optical system. In other words, it is possible to form the solid-state imaging device as two-sensor construction consisting of a first solid-state imaging device having pixels to be used as the first pixel and a second solid-state imaging device having pixels to be used as the second pixel, and a half mirror for example is used to allow object light to enter.

Further, the timing for effecting correction data acquiring operation is not specifically limited, and it may be effected for example at the shipping from factory or be effected at every image taking operation. It is desirable that the correction data is provided for each condition of focal distance and stop of the imaging optical system and for each taking lens if the taking lens is interchangeable.

It is not necessary, however, to have correction data for each of all conditions, and it is possible to substitute correction data under a certain condition for another or to make a desired correction data from correction data under other condition.

Further, it is desirable that the sensitivity correction data corresponding to one frame of image is obtained from the output ratio between each of the first pixel and the second pixel disposed at locations that are regarded as substantially the same location at which image is formed by the imaging optical system 1. An average value of output ratios in an optional region, however, may be used as a representative value of correction data. In such case, the optional region may either be located at one place or be provided at a plurality of locations.

It is naturally necessary that the correction method of signal of the first pixel or the second pixel and the method for obtaining their differential be suitable methods corresponding to difference in exposure conditions between the first pixel and the second pixel.

With the solid-state imaging apparatus of the construction shown in the above first and second embodiments, high-quality image taking data are obtained because signals of the first pixel and the second pixel may be corrected. It is fundamentally, however, nothing but a simple adjustment where the sensitivity characteristic of the second pixel is adapted to the characteristic of the first pixel, and, for this reason, correction up to the case where variance in the sensitivity of the first pixel occurs within a region of the pixel section cannot be effected. Such variance within a pixel region is referred herein to as shading.

Figure 12:
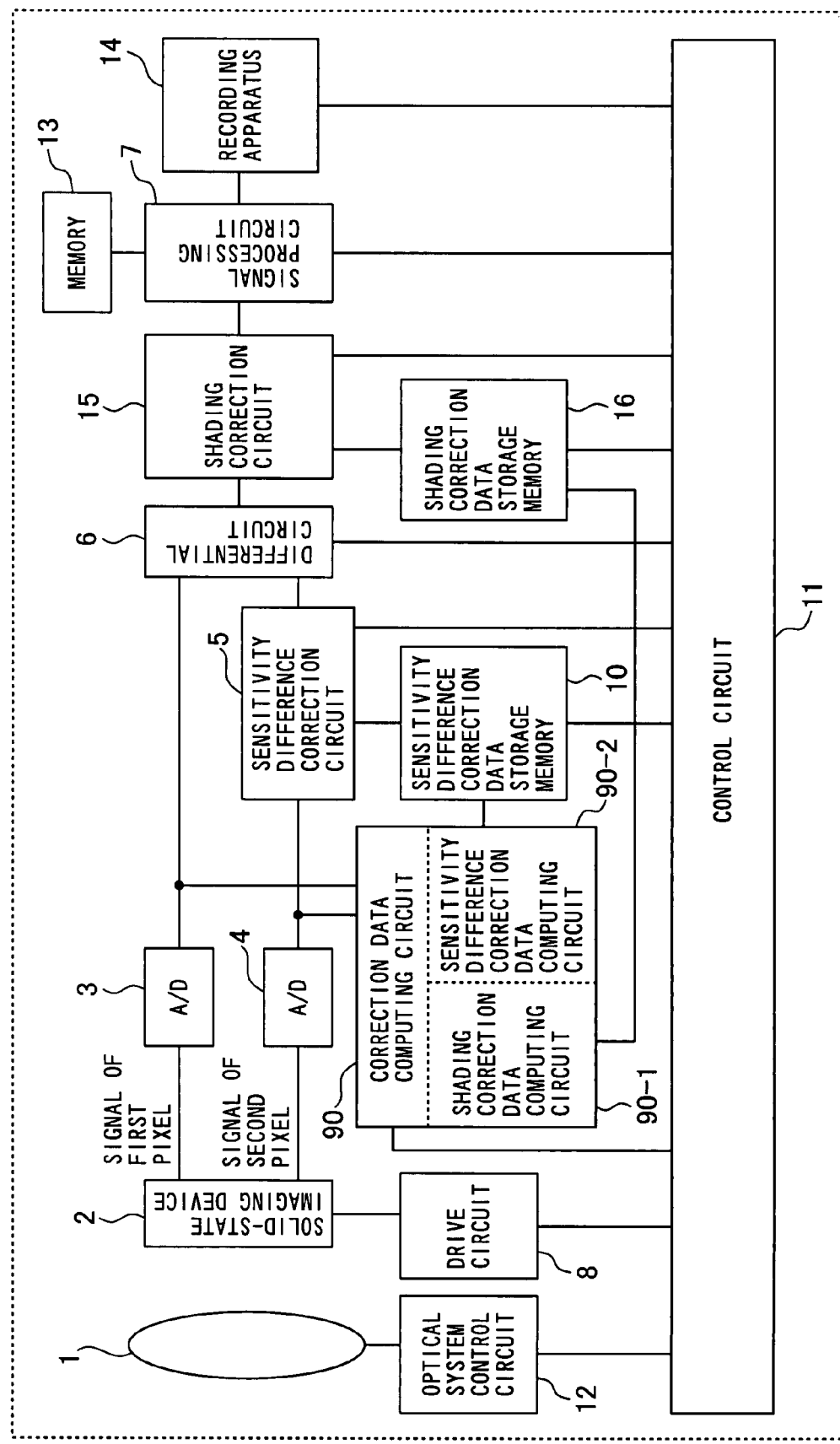
FIG. 12 is a block diagram showing construction of the solid-state imaging apparatus according to a third embodiment.

One adapted to be capable of correcting such shading will be described below as a third embodiment of the invention. FIG. 12 is a block diagram showing construction of the solid-state imaging apparatus according to the third embodiment. In the construction of the solid-state imaging apparatus according to this embodiment, a shading correction circuit 15 is provided at a stage following the differential circuit 6 in the solid-state imaging apparatus according to the first embodiment shown in FIG. 9, and a corresponding shading correction data storing memory 16 is additionally provided. Further, a correction data computing circuit 90 includes a shading correction data computing circuit 90-1 and a sensitivity difference correction data computing circuit 90-2.

An operation of the solid-state imaging apparatus having the above described construction will now be described. In a general classification, this solid-state imaging apparatus contains a sensitivity difference correction data acquiring operation, shading correction data acquiring operation, and image taking operation. Since the sensitivity difference correction data acquiring operation is similar to that of the solid-state imaging apparatus according to the first embodiment, a description will be given below with respect to the shading correction data acquiring operation and image taking operation.

The shading correction data acquiring operation is effected in accordance with the following procedure.

(1) At first, the drive circuit 8 under instruction from the control apparatus 11 controls drive of the solid-state imaging device 2 so that image signal of the first pixel is obtained.

(2) An image of a uniform object is taken in such condition, and the acquired image signal of the first pixel of the solid-state imaging device 2 is converted into digital signal at A/D conversion apparatus 3.

(3) The digitized image signal of the first pixel is inputted to the shading correction data computing circuit 90-1.

(4) At the shading correction data computing circuit 90-1, while signal of a certain first pixel (i) at center of a region of the pixel section is normalized as 1, output levels of the other regions are obtained and their reciprocals are computed.

(5) The result of computation at the step of (4) is stored to the shading correction data storing memory 16 as shading correction data corresponding to one frame of image.

Figure 13A:
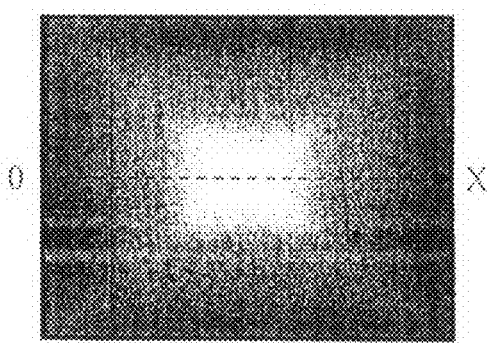
FIGS. 13A and 13B show manners of shading in output image.
Figure 13B:
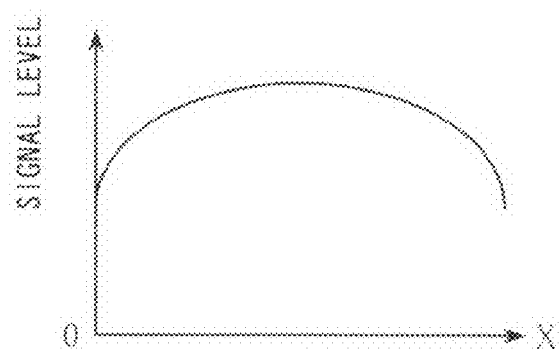
Figure 14A:
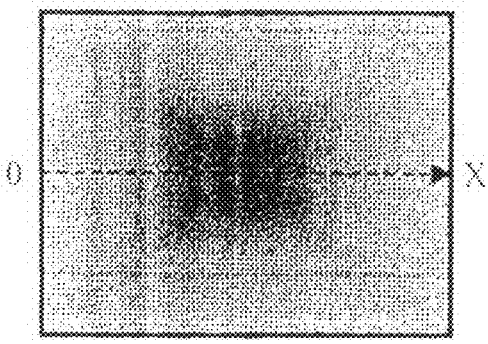
FIGS. 14a and 14B show examples of shading correction data.
Figure 14B:
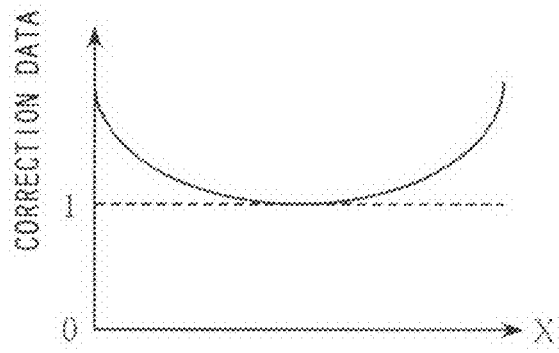

FIG. 13A shows an image of the first pixel acquired at the time of shading correction data acquiring operation; and FIG. 13B shows the manner of shading (signal level) along a horizontal direction (O-X) in a center portion of the frame in the image shown in FIG. 13A. FIGS. 14A and 14B show shading correction data computed from the image shown in FIG. 13A with using reciprocals obtained when signal of a certain pixel at center of a region of the pixel section is normalized as 1. FIG. 14A shows shading correction data corresponding to one frame of image; and FIG. 14B shows shading correction data along the horizontal direction (O-X) in a center portion of the frame.

The procedure of image taking operation will now be described.

(1) At first, the drive circuit 8 under instruction from the control apparatus 11 controls drive of the solid-state imaging device 2 so that exposure time is different between the first pixel and the second pixel in a similar manner as the first embodiment. Here, the only difference in the exposure conditions between the first pixel and the second pixel is the exposure time, and the conditions of the imaging optical system such as focal length and stop are the same for both.

(2) The image signals of the first pixel and the second pixel of the solid-state imaging device 2 acquired at that time are converted into digital signals respectively at A/D conversion apparatus 3 and 4.

(3) The digitized image signal of the second pixel is inputted to the sensitivity difference correction circuit 5, and is corrected as multiplied by a most suitable data among the sensitivity difference correction data stored at the sensitivity difference correction data storing memory 10. Supposing signal of a certain second pixel (i) at this time as S22(i), the signal after correction is S22(i)×S1(i)/S2(i) (i=1 to n). Here, the most suitable data refers to data that is obtained when the conditions of the imaging optical system at the time of acquiring the sensitivity difference correction data are substantially equivalent to those at the time of the image taking operation.

(4) The digitized signal of the first pixel and the signal of the second pixel after correction are inputted to the differential circuit 6 to obtain the differential. Supposing the signal of a certain first pixel (i) at this time as S11(i), signal after the differential is S11(i)−S22(i)×S1(i)/S2(i) (i=1 to n). Such difference signal is a signal that depends on difference in exposure time between the first pixel and the second pixel.

(5) The above difference signal is inputted to the shading correction circuit 15 and is multiplied by a most suitable data among the shading correction data stored at the shading correction data storing memory 16 so as to effect shading correction. Here, the most suitable data refers to data that is obtained when the conditions of the imaging optical system at the time of acquiring the shading correction data are substantially equivalent to those at the time of the image taking operation.

(6) The signal after shading correction is inputted to the signal processing circuit 7 so as to be subjected for example to color processing, interpolation, and gamma processing, and the image taking data at the end is stored to the recording apparatus 14.

In this manner, with the solid-state imaging apparatus according to the above third embodiment, correction of shading also becomes possible in addition to correction of sensitivity characteristic difference between the signals of the first pixel and of the second pixel so that image taking data of even higher quality can be acquired. Also in the shading correction, high-quality image taking data can always be acquired even if the conditions such as focal length and stop of the imaging optical system are changed.

It is desirable that the correction data for the shading correction are also provided for each of the conditions of focal distance and stop of the imaging optical system and, if the taking lens is interchangeable, for each taking lens. However, it is not necessary to provide correction data for each of all conditions, and it is possible to substitute correction data under a certain condition for another or to make a desired correction data from correction data under other condition. Further, while the case of effecting shading correction on difference signal has been shown in the above third embodiment, it is also possible to effect shading correction of the first pixel at first and then to effect the sensitivity difference correction and differential operation. It is furthermore possible at first to correct shading of the first pixel and of the second pixel and then to effect sensitivity difference correction and differential operation.

According to the present invention, since a characteristic difference correction means is provided to correct characteristics difference between the photoelectric conversion devices of the first pixel and of the second pixel, a solid-state imaging apparatus can be achieved as having a global shutter function and at the same time capability to obtain high-quality image signal without FPN due to dark current and KTC noise.

What is claimed is:

1. A solid-state imaging apparatus comprising:
    a pixel section having two-dimensionally arrayed unit pixels each having a first pixel and a second pixel respectively containing photoelectric conversion devices that are located at positions regarded as the same position at which image is formed by an imaging optical system;
    a reset control means for simultaneously resetting respectively independently all the said first pixels and all the said second pixels of each unit pixel arrayed in said pixel section;
    a difference signal output means for obtaining a difference signal between signals of said first pixel and of said second pixel;
    a control section for rendering control such that a reset is effected of signals of all the first pixels of said pixel section and, after a desired exposure time, a reset is effected of signals of all the second pixels of said pixel section by said reset control means, and then signals of the first pixel and of the second pixel are read out respectively in a simultaneous or substantially simultaneous manner immediately after the reset of signal of all the said second pixels by said reset control means so as to output a difference signal between these as imaging signal by said difference signal output means; and
    a characteristic difference correction means for correcting a characteristic difference between said first pixel and said second pixel.

2. The solid-state imaging apparatus according to claim 1, wherein said characteristic difference correction means has a sensitivity difference correcting section where a ratio of sensitivity characteristic between said first pixel and said second pixel is used as sensitivity difference correction data.

3. The solid-state imaging apparatus according to claim 2, wherein said sensitivity difference correcting section effects correction of pixel signal of at least one of said first pixel and second pixel based on said sensitivity difference correction data.

4. The solid-state imaging apparatus according to claim 2, wherein said sensitivity difference correcting section uses said sensitivity difference correction data which is acquired with setting the condition of accumulation and the condition of the imaging optical system to be the same for said first pixel and second pixel.

5. The solid-state imaging apparatus according to claim 2, wherein said sensitivity difference correcting section changes said sensitivity difference correction data in accordance with image taking conditions.

6. The solid-state imaging apparatus according to claim 1 further comprising a shading correction means.

* * * * *